United States Patent [19]

Hilgendorff et al.

[11] Patent Number: 5,076,923

[45] Date of Patent: Dec. 31, 1991

[54] APPARATUS FOR SEPARATING MIXTURES BY SPACED STACKED MEMBRANE ELEMENTS

[75] Inventors: Walter Hilgendorff, Tespe; Gerhard Kahn, Geesthacht, both of Fed. Rep. of Germany

[73] Assignee: GKSS Forschungszentrum Geesthacht GmbH, Geesthacht, Fed. Rep. of Germany

[21] Appl. No.: 598,882

[22] Filed: Oct. 17, 1990

[51] Int. Cl.$^5$ .............................................. B01D 63/00
[52] U.S. Cl. ............................ 210/321.6; 210/321.75; 210/321.84; 210/350
[58] Field of Search ........... 210/321.6, 321.75, 321.83, 210/321.84, 651, 456, 321.85, 347, 230, 232, 350, 356

[56] References Cited

U.S. PATENT DOCUMENTS

| | | | |
|---|---|---|---|
| 3,494,468 | 1/1968 | Kohl | 210/346 |
| 4,212,742 | 7/1980 | Solomon et al. | 210/346 |
| 4,695,380 | 9/1987 | Hilgendorff et al. | 210/347 |
| 4,995,977 | 2/1991 | Hilgendorff et al. | 210/321.84 |
| 5,002,667 | 3/1991 | Kutowy et al. | 210/321.75 |

Primary Examiner—Frank Spear
Assistant Examiner—Ana Fortuna
Attorney, Agent, or Firm—Robert W. Becker & Associates

[57] ABSTRACT

An apparatus for separating fluid mixtures by membrane elements, which are spaced and arranged into a membrane element stack via a supporting frame that comprises outer and inner rings, whereby the membrane elements have a boring for draining a permeating substance. The boring has an inlet port for introducing the mixture into the apparatus and an outer port for the retained substance as well as the permeating substance. In mixture compartments, formed by the membrane elements between said inner and outer rings, the mixture to be separated flows past areas of the membrane elements, having a constant effectiveness, whereby the flow cross-sections of the mixture compartments vary from the introduction port to the exit port of the membrane stack. All inner and outer rings of the membrane element stack have identical dimensions, and the differing cross-sections in the mixture compartments are adjustable at least by varying the width of the membrane elements.

7 Claims, 2 Drawing Sheets

APPARATUS FOR SEPARATING MIXTURES BY SPACED STACKED MEMBRANE ELEMENTS

BACKGROUND OF THE INVENTION

The invention relates to an apparatus for separating fluid mixtures by membrane elements, which are spaced and arranged into a membrane element stack via a supporting frame that comprises outer and inner rings, said membrane elements having a boring for draining a permeating substance which boring has an inlet port for introduction of said mixture into said apparatus and an outlet port for retained substance as well as said permeating substance, wherein, in mixture compartments formed by said membrane elements between said inner and outer rings, said mixture to be separated flows past areas of said membrane elements, having a constant effectiveness, whereby the flow cross-sections of said mixture compartments vary from the introduction port to the exit port of said membrane stack.

An apparatus of the aforementioned kind is known from DE-PS 35 07 908. This apparatus has been developed for the purpose of reducing or avoiding the formation of cover layers on the liquid-selective surfaces of the membrane elements which reduce the effectiveness of the membrane elements.

Theoretical studies have shown that the formation of such cover layers on the liquid-selective surfaces of the membrane elements is influenced to a considerable extent by the tangential stress on the wall (Kulozik, Einflüsse auf die Permeation von Wasser und gelösten Stoffen sowie auf den Deckschichtabtrag bei der Umkehrosmose, Fortschrittsberichte VDI Verlag, Düsseldor, 1986). Because the tangential stress on the wall changes with the square of the flow velocity of a liquid, means must be provided in the known apparatus that ascertain a constant velocity of the liquids to be separated when passing from the inlet port to the outlet port. In the aforementioned known apparatus this is achieved by shaping the mixture compartments differently, through which the mixture to be separated passes from the inlet to the outlet port, such that the flow cross sections, from the inlet port to the outlet port, are reduced in order to maintain a constant flow velocity of the mixture inside the apparatus according to the aforementioned requirement. This means, that the cross section of the flow channels of the mixture is reduced according to the volume reduction of the mixture by the removal of the permeating substance.

In the known apparatus the reduction of the flow cross section is achieved by varying the width of the inner and outer rings of the supporting frame that supports the membrane elements. Thereby the inside width of the mixture compartment is varied.

The apparatus of the prior art requires a costly and difficult production due to the large number of outer and inner rings of various widths, which also requires a large storage capacity for various parts, so that the apparatus may only be manufactured and provided at relatively high cost.

For example, the inner and outer rings of the supporting frame must be produced by injection molding, so that for each individual width of the inner and outer ring a separate mold must be manufactured. The cost for a respective injection mold are close to $ 20,000 so that, in order to produce the apparatus of the prior art, a large amount of money is required for the manufacture of the molds alone.

Another problem is the manufacturing process itself and the storage of the multitude of inner and outer rings of varying widths for the assembly of the known apparatus.

Also, close attention must be paid during the assembly of the apparatus of the prior art, so that only highly qualified personnel may assemble the apparatus.

It is therefore an object of the present invention to provide an apparatus for separating mixtures, which is of a simplified and less expensive design but achieves the same or increased separation quality compared to the known apparatus, which allows for reduced storage requirements as well as for an easy assembly by unskilled personnel, so that the apparatus of the present invention may be provided at lower cost.

BRIEF DESCRIPTION OF THE DRAWINGS

This object, and other objects and advantages of the present invention will appear more clearly from the following specification in conjunction with the accompanying drawings, in which.

SUMMARY OF THE INVENTION

Figure 1:
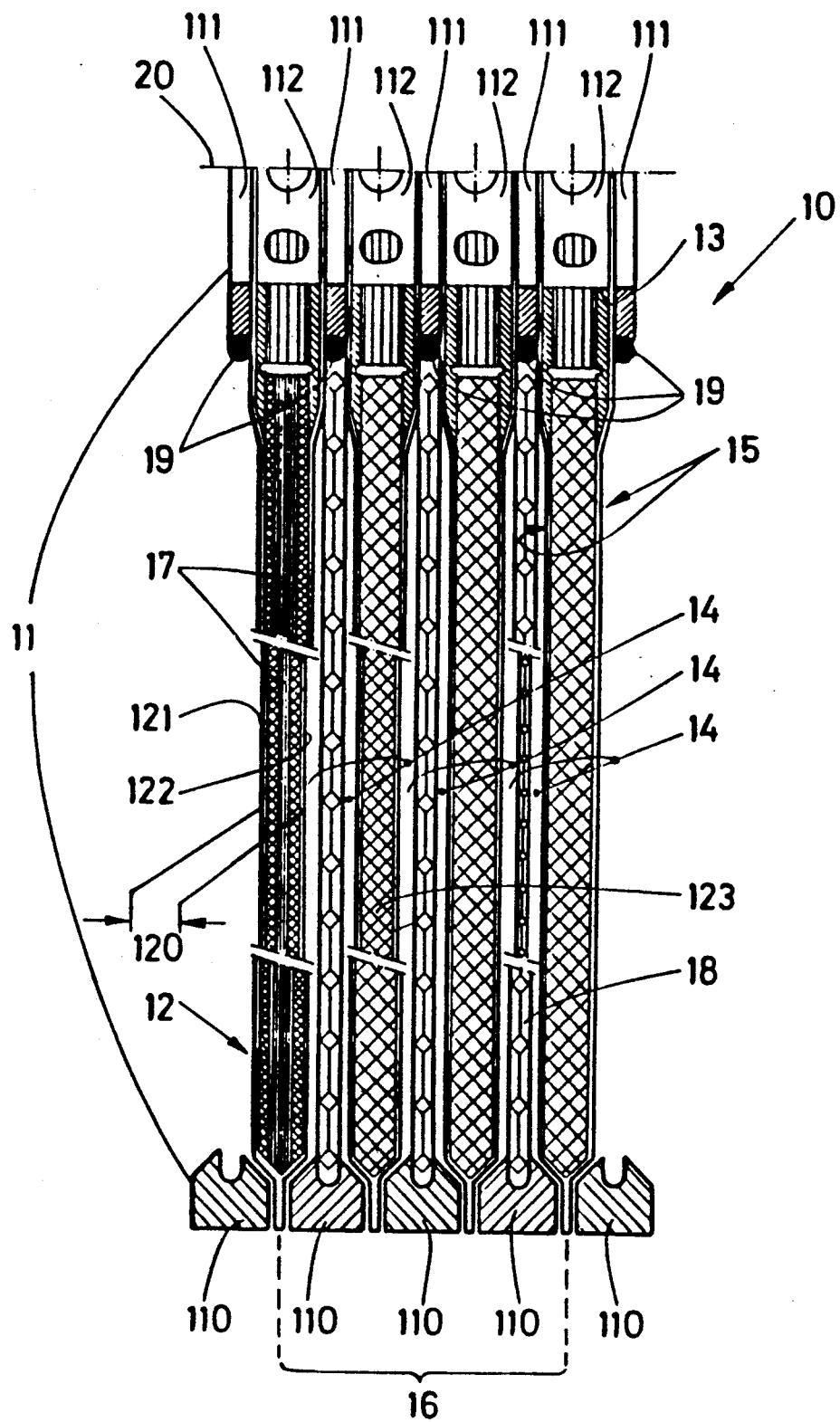
FIG. 1 is a cross-sectional view of a part-sectional representation of one half of the disk-shaped membrane elements and inner and outer rings which enclose the membrane elements, the turbulence generating plates and the sealings.

The apparatus of the present invention for separating mixtures is primarily characterized by inner and outer rings of the membrane element stack having the same dimensions, whereby the differing flow cross-sections in the mixture compartments are adjustable at least by varying the width of said membrane elements.

The advantage of the present invention is primarily that the individual membrane elements, which, with respect to the inner and outer rings, comprise only a small portion of the total manufacturing cost of the apparatus, may be formed to varying widths without any particular technical alteration and added expense, so that, with this measure alone, the flow cross section of the mixture compartment formed between two membrane elements of a membrane element stack may easily be varied, i e., adjusted, with respect to the width of the membrane element.

In a preferred embodiment of the apparatus, the membrane elements are formed as cushion-type membrane elements, whereby an insert, having a large surface area and a variable width, is arranged between two outer selective membranes having a large surface area. In this embodiment the membranes of the cushion-type membrane element having a large surface area remains constant with respect to their dimensions, while, depending on the desired reduction of the flow cross section, the insert between the membranes may vary. This may be achieved during the assembly of the cushion-type membrane element without difficulties and without any additional effort.

The apparatus of the present invention may also function with "membrane elements" other than the cushion-type membrane element, whereby these "membrane elements" may be essentially comprised of a selective membrane having a large surface area which is supported by a supporting plate having a large surface area.

In this embodiment, the variation of the flow cross section of the mixture compartment is achieved simply by varying the width of the respective supporting plates. The supporting plate having a large surface area may also be used in addition to, or instead of, the aforementioned inserts having a large surface area in the cushion-type membrane elements, whereby, in accordance with the present invention, the widths of the supporting plates are preferably variable for adjusting different flow cross sections.

It is also preferable to dispose, inside the mixture compartment, turbulence generating plates which have a large surface area and are essentially parallel to said membrane elements and, for the adjustment of varying flow cross sections, may have varying widths. They are, in general, provided for the reduction of the flow cross sections in the mixture compartments, when such a reduction is desired, but are dispensable when a reduction of the flow cross section is unnecessary in further mixture compartments of the apparatus.

In may be advantageous for special applications to provide, in an area between two inner rings, a drainage ring equipped with a number of radial openings for the passage of the permeating substance, which is enclosed between the membranes that delimit the cushion-type membrane element. This is especially preferred when the outlet cross section of the boring in the membrane for the permeating substance is desired to be large in order to reduce the outlet resistance of the permeating substance. The drainage ring also facilitates the incorporation of membrane elements of varying widths, respectively cushion-type membrane elements, because the area of the membranes between the inner ring area then always has a pre-determined axial width due to the drainage ring.

In order to increase the outlet cross section of the permeating substance in the direction of the boring, the aforementioned radial openings for the passage of the permeating substance are provided at the drainage ring. The increased outlet cross section for the permeating substance is especially advantageous when, as in the case of gas separation and pervaporation, the apparatus is operated under reduced pressure, whereby the volume of the permeating substance is increased and requires more space.

The drainage ring is preferably comprised of two essentially identical ring portions which are connectable via a clip-on device. They may be manufactured at low cost, because only one injection mold is necessary for their production. The assembly is further facilitated because, in order to assemble a complete drainage ring, only the two halves must be axially connected, thereby enclosing, if desired, the rim portion of an inner boring of a supporting plate on which the membrane rests or which is enclosed by the two membranes of a cushion-type membrane element.

DESCRIPTION OF PREFERRED EMBODIMENTS

The present invention will now be described in detail with the aid of several specific embodiments utilizing FIGS. 1 and 2.

The apparatus 10 of the present invention essentially comprises a supporting frame, which consists of an inner ring 111 and an outer ring 110. One membrane element 12 is enclosed by two respective outer rings 111 and two inner rings 111. Between two membrane elements 12 respectively, a mixture compartment 14 is formed. The outer rings 110 and inner rings 111 which form the supporting frame 11 are of an identical design, so that for their production only one respective injection mold is necessary.

A membrane stack 16 is comprised of a predetermined number of membrane elements 12 with respective outer and inner rings 110, 111, as represented in the exemplary embodiment of FIG. 1. In general, the apparatus 10 is constructed as described in DE-PS 35 07 908. Especially with respect to the flow of the mixture to be separated, which may be liquid as well as gaseous, and the flow of the retained substance and the permeating substance reference is made to the aforementioned patent. However, it shall be mentioned that, from the inlet port to the outlet port of the apparatus, the liquid mixture to be separated flows in a meandering-like fashion through the individual mixture compartments 14, thereby essentially contacting in parallel manner the large membrane element surface area 15. The permeating substance, which passes the membranes 121, 122 of the exemplary membrane element in the form of a so-called cushion (cushion-type membrane element), reaches the area between two inner rings 111, leaves the cushion-type membrane element via the boring 13 and is guided to an outlet port for the permeating substance of the apparatus 10.

The membrane elements 12 are sealed against each other in the area of the inner rings 111 via sealing 19, for example, O-rings. Only one half of the inner ring 111, relative to an axis 20 of the apparatus, is represented in FIG. 1 in order to simplify the drawing.

As mentioned above, the membrane elements 12 are formed as cushion-type membrane elements, through which the permeating substance passes in the direction of the boring 13 between two outer membranes 121, 122, which in their outer rim portion that faces the outer rings 110 are connected in a tight manner, for example, by fusing. Between the membranes 121, 122 an insert 123 is disposed, which varies in its width in order to achieve different flow cross sections in the mixture compartments 14. Thereby the total width of the membrane element 12 is adjustable, since, by varying the width of the membrane element 12, the flow cross section of the mixture compartment 14, between the two membrane elements 12, is adjustable.

In addition to or instead of the insert 123 a supporting plate 17 may be arranged between the membranes 121, 122, the width of which may also be varied in order to adjust the width of the membrane element.

It is also possible to dispose a turbulence generating plate 18 in the mixture compartment 14 formed between two membrane elements 12, which may, in general, prevent the undesired deposition of materials, contained in the liquid mixture, in the form of cover layers on the membrane element surface area 15. At the same time, it ascertains a good distribution of the liquid mixtures on the membrane element surface area 15. The turbulence generating plate 18 may therefore also serve to adjust the flow cross section of the mixture compartment 14. Varying widths of the plate 18 result in various flow cross sections in the mixture compartment 14, so that this means of adjusting the flow cross section, together with varying widths of the insert 123 in the membrane element 12 and varying widths of the supporting plate 17 in the membrane element 12, allows for multiple adjustments of the flow cross section in the mixture compartment 14 of the apparatus 10.

Figure 2:
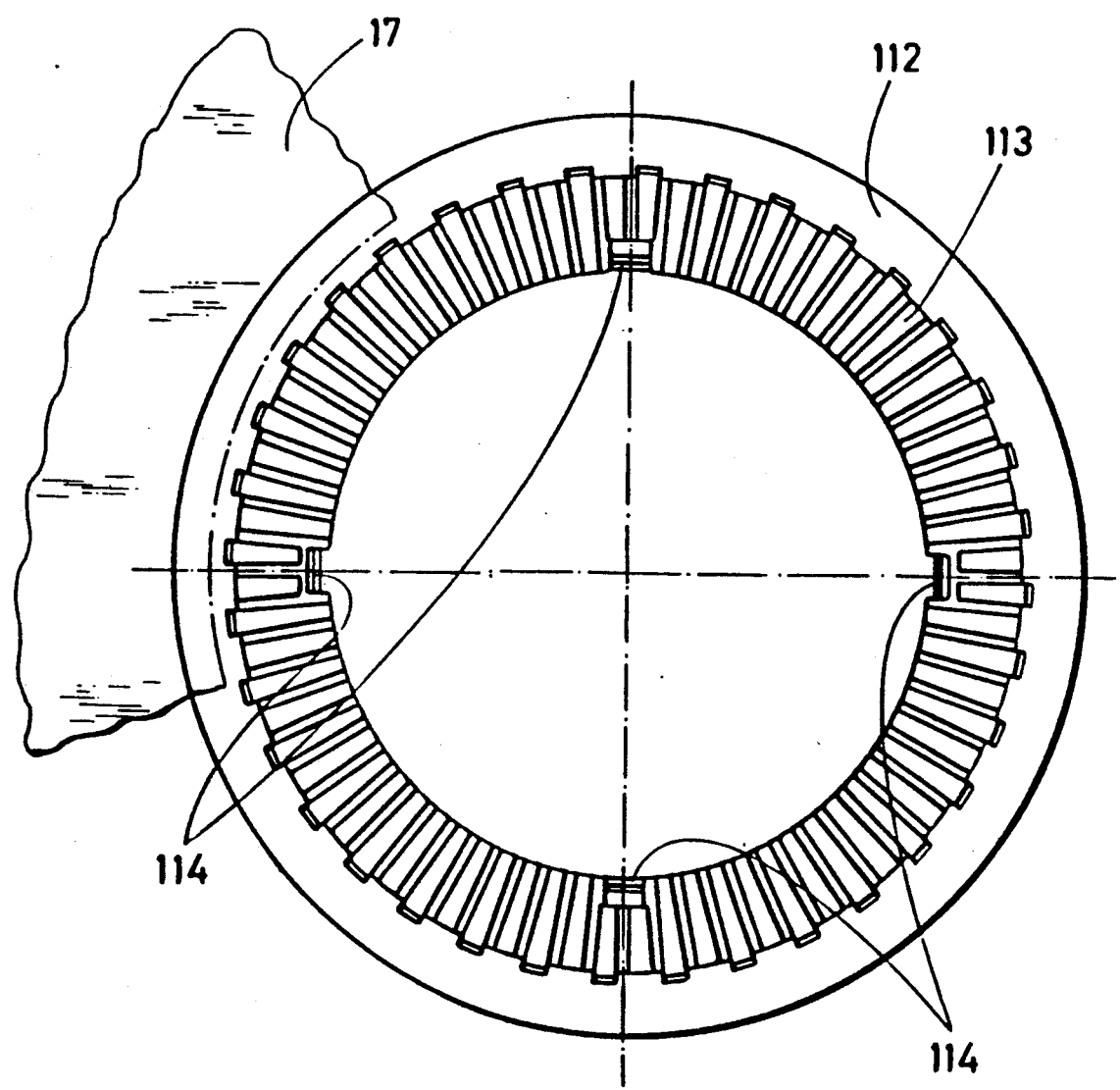
FIG. 2 a top view of one part of the two-part drainage ring.

FIG. 2 shows a ring portion of a drainage ring 112, whereby the mounted drainage ring, cf. FIG. 1, consists of two essentially identical ring halves, which are connectable by clip-on devices 114. In special embodiments of the apparatus 10, which are designed for the easy assembly of membrane elements 12 of varying widths, the drainage ring 112 is arranged in the area of two inner rings 111, whereby the diameter of the drainage ring is somewhat larger than the diameter of the inner ring 111. The drainage ring 112 is provided with a number of radial openings for the passage of the permeating substance. It consists of two essentially identical ring portions, which are easily connectable with clip-on devices 114. Between two ring portions of the drainage ring 112, at the outer rim, a supporting plate 17 may enclosed in the area of the inner boring, cf. the dashed line in FIG. 2.

The outer rings 110 and inner rings 111 in FIG. 1 are represented as separate parts. However, it is also possible to form the outer rings 110 and/or the inner rings 111 as one piece, for example, via a thin plate, which is essentially parallel to the membrane element. (This further embodiment is not represented in the drawings.) The cost of the manufacture of the apparatus may thereby be reduced even further in comparison with the construction comprising individual outer and inner rings 110, 111, because then only one injection mold is necessary.

All of the aforementioned embodiments have the advantage, in comparison to the means for the adjustment of the flow cross section in the mixture compartment described in the prior art, that they may be achieved with lesser cost and less technical alteration and expense, since all the aforementioned parts of the apparatus of the present invention may be mass-produced and provided in bulk in a relatively simple way, so that storage is facilitated and storage costs are reduced.

The present invention is, of course, in no way restricted to the specific disclosure of the specification, examples and drawings, but also encompasses any modifications within the scope of the appended claims.

What we claim is:

1. An apparatus for separating liquid and gaseous mixtures by membrane elements, which are spaced and arranged into a membrane element stack via a supporting frame that comprises outer and inner rings, said membrane elements having a boring for draining a permeating substance, with said apparatus having an inlet port for introducing a mixture into said apparatus and an outlet port for a retained substance as well as said permeating substance, wherein, in mixture compartments formed by said membrane elements between said inner and outer rings, said mixture to be separated flows past areas of said membrane elements, having a constant effectiveness, whereby the flow cross-sections of said mixture compartments vary from an introduction side to an exit side of said membrane stack, the improvement wherein:

all of said inner rings of said membrane element stack have identical dimensions and all of said outer rings of said membrane element stack have identical dimensions, with said flow cross-sections in said mixture compartments being adjustable, to vary same, via means for at least varying a width of said membrane elements.

2. An apparatus according to claim 1 in which each of said membrane element is formed as a cushion-type membrane element comprised of two outer membranes having a large surface area and an insert having a large surface area and a variable width.

3. An apparatus according to claim 2 in which said membrane element is supported by a supporting plate having a large surface area and a variable width.

4. An apparatus according to claim 3 in which said supporting plate is arranged between said two outer membranes of said cushion-type membrane element.

5. An apparatus according to claim 2 in which, in an area between two of said inner rings, a drainage ring with a number of radial openings for removal of said permeating substance is enclosed between said membranes.

6. An apparatus according to claim 5 in which said drainage ring comprises two essentially identical ring portions which are connectable via a clip-on device.

7. An apparatus according to claim 1 in which, inside each of said mixture compartments, a turbulence generating plate is disposed which has a large surface area and is essentially parallel to said membrane element.

* * * * *